Aug. 6, 1946.  E. M. GADOUX ET AL  2,405,350
TWO STROKE ENGINE
Filed June 15, 1945  2 Sheets-Sheet 1
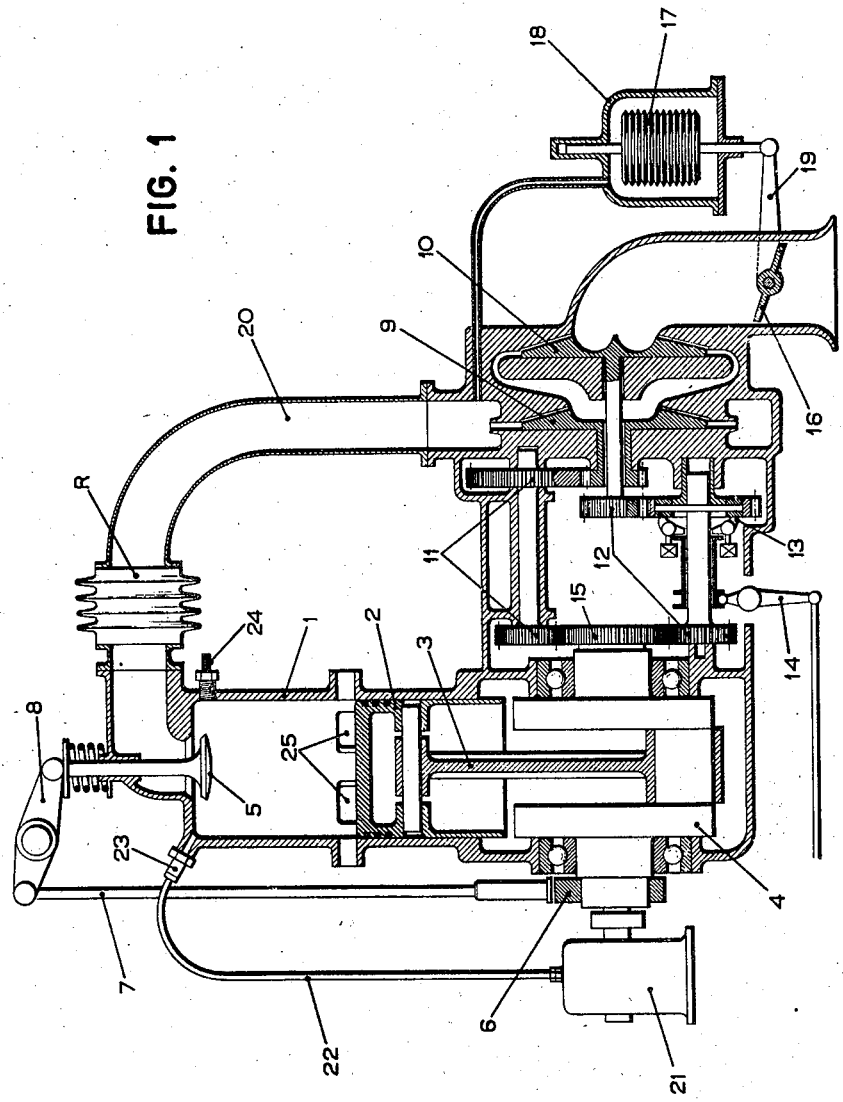

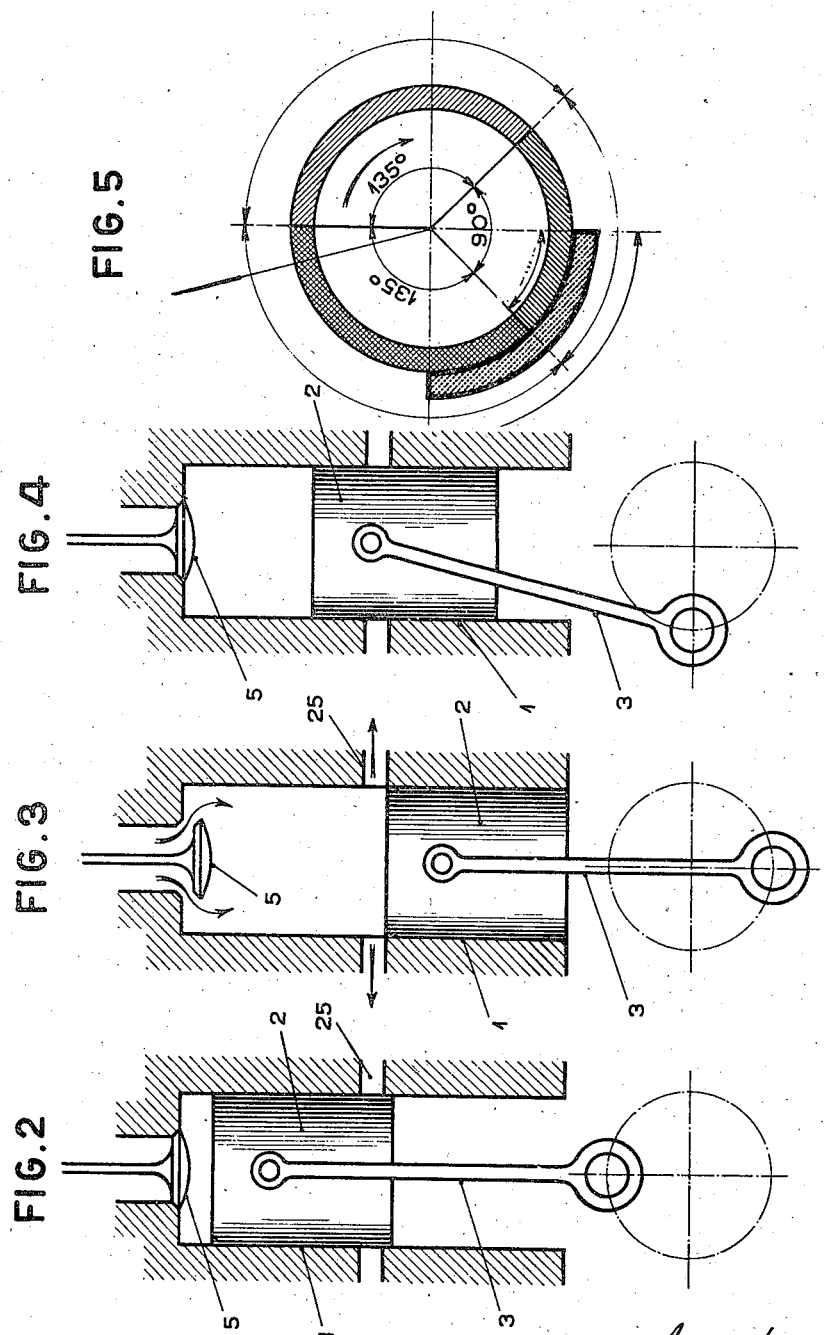

Patented Aug. 6, 1946

2,405,350

UNITED STATES PATENT OFFICE 2,405,350

TWO-STROKE ENGINE

Eugène Marius Gadoux, Cormeilles-en-Parisis, and Jacques Fouré, Paris, France

Application June 15, 1945, Serial No. 599,578
In France February 2, 1945

1 Claim. (Cl. 123—65)

The present invention has for its object an internal combustion engine operating in accordance with the two stroke cycle, said engine being more particularly, but not exclusively, intended for use on aircrafts and being chiefly characterized by the application of one or more valves on each cylinder, said valves serving for the injection of air under pressure with the triple object of sweeping the exhaust gases, of feeding the engine and of cooling the piston head, the feed with fuel being provided at the end of the compression stroke through direct injection.

This engine is also characterized by the combination of two air compressors driven by the engine through speed increasing means so as to be operative, one in a permanent manner and the other when actuated, either by hand or by a suitable automatic device, only when it is necessary to resort to supercharging as is the case for instance when the engine is mounted on an aircraft flying at high altitude.

Lastly, the engine which forms the object of the invention is characterized by a number of detail features which will appear when reading the following description of a particular embodiment given by way of example without any limitation of the scope of the invention. Said embodiment is illustrated diagrammatically in the accompanying drawings wherein:

Fig. 1 is a longitudinal cross-section of the whole of the engine;

Figs. 2 to 4 are explanatory diagrams showing the position of the piston respectively at its upper dead center, at its lower dead center and at the moment of the closing of the air admission valve.

Fig. 5, lastly, is the distribution diagram.

The diagrammatical cross section of Fig. 1 illustrates a one cylinder engine and the following description is of such a one-cylinder engine, but it is obvious that the invention is applicable to engines comprising any number of cylinders.

Inside the cylinder 1 is adapted to move the piston 2 controlling by means of the connecting rod 3 the crank-shaft 4. In the head of the cylinder is arranged the air admission valve 5 controlled by a cam 6 rotating at the same speed as the engine and acting through the agency of the rod 7 on the valve controlling lever 8.

The air is forced into the cylinder through two centrifugal or volumetric compressors, the turbines of which are shown at 9 and 10 on the drawings. The compressor 9 is controlled by a speed increasing gear 11 which is permanently operative. The compressor 10, also controlled by a speed increasing gearing 12, is only operative in the case where the motor is to be supercharged. To this end, it is provided with a clutch 13 illustrated, by way of example only, in the form of a centrifugal weighted clutch controlled either by hand through the links 14 or automatically in dependence on the altitude reached by the aircraft fitted with the engine forming the object of the invention. The gearings 11 and 12 are driven from the driving shaft through the agency of the toothed wheel 15.

The clutch 13 may be of any type, whether hydraulic, electromagnetic or the like.

On the other hand, the admission of air to the compressor is adjusted by a throttle valve 16 controlled by an aneroid capsule 17 located inside the bell shaped part 18 and acting on the throttle valve through the agency of the lever 19.

The air is forced by the compressor or compressors into the engine through the pipe 20 and passes during its travel over a radiator R adapted to cool said air.

The fuel forced under pressure by the pump 21 is led through the pipe 22 to the injector 23 which ensures its introduction into the engine. The ignition is obtained through the spark plug 24.

Lastly, ports 25 are provided in the cylinder wall for the exhaust of the combustion products, at a level such that said ports are uncovered when the piston arrives at its lower dead center.

The operation of the above described engine is as follows (see Figs. 2 to 5):

The cylinder is supposed to be filled with the compressed mixture of air and fuel. The spark plug 24 produces the ignition of the mixture and under the action of the pressure evolved by the explosion inside the gaseous mass, the piston 2 is urged towards the lower end of the cylinder 1 (Fig. 2).

*Downward stroke of the piston.*—At the end of the expansion stroke, the upper part of the piston uncovers the exhaust ports 25; the combustion products begin being exhausted and the pressure inside the cylinder decreases. The cam 6 is angularly set in a manner such that there is produced at this moment an opening of the air admission valve 5 (Fig. 3). The compressed air is admitted through this valve and forces into the atmosphere the exhaust gases remaining in the cylinder. The piston begins then its upward stroke.

*Upward stroke of the piston.*—As it rises, the piston covers the exhaust ports 25, the valve 5 remaining open during part of this upward stroke of the piston, so that the compressed air continues entering the cylinder until the moment (Fig. 4) at which, under the action of the control cam 6, said valve closes.

The angular setting of the cam 6 and its shape are determined in a manner such that the closing of the valve 5 occurs at the moment at which the pressure of the air introduced into the cylinder balances the pressure due to the compression of said air under the action of the rise of the piston inside the chamber formed between the bottom of the cylinder and the top of the piston.

*Injection.*—A little before the piston arrives at its upper dead center (see Fig. 5) the pump 21 which operates in synchronism with the crankshaft 4 sends the liquid fuel into the cylinder through the injector 23. The spark flashes then at the spark plug and produces the ignition of the explosive mixture so that the above described cycle begins over again.

The feeding with air under normal running conditions is ensured through the compressor 9 which is always in clutch and which may be either a centrifugal or a volumetric compressor. In case of necessity, for instance in case of flight at high altitudes when the engine is carried on board of an aircraft, the supercharging is obtained as explained hereinabove by means of the centrifugal or volumetric compressor 10 rendered operative by hand or automatically through the agency of a suitable clutch.

Obviously the details of execution described and illustrated have been given only by way of an exemplification of a reduction to practice of the invention and these details may be modified in different manners and certain arrangements may be replaced by certain other equivalent devices without any modification in the principles underlying the invention. Thus, for instance, the engine may comprise several compressors for normal running and several supercharging compressors instead of a single compressor of each kind.

What we claim is:

In a two stroke engine, the provision of at least one valve in each cylinder, at least one compressor, means whereby said compressor is adapted to feed said cylinder with compressed air through said valve, speed increasing means wherethrough the engine drives the compressor in a permanent manner, an engine controlled cam controlling the opening of the valve, a further compressor for supercharging the cylinders through said valve, speed reducing means adapted to be driven by the engine for controlling said further compressor, and means whereby the last mentioned means are caused to be operative when desired.

EUGÈNE MARIUS GADOUX.
JACQUES FOURÉ.